United States Patent
Hsu et al.

(10) Patent No.: US 10,089,433 B2
(45) Date of Patent: Oct. 2, 2018

(54) METHOD FOR TRIPLE-PATTERNING FRIENDLY PLACEMENT

(71) Applicant: Taiwan Semiconductor Manufacturing Co., Ltd., Hsinchu (TW)

(72) Inventors: Meng-Kai Hsu, Hsinchu (TW); Yuan-Te Hou, Hsinchu (TW); Wen-Hao Chen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 193 days.

(21) Appl. No.: 15/145,455

(22) Filed: May 3, 2016

(65) Prior Publication Data

US 2017/0323047 A1  Nov. 9, 2017

(51) Int. Cl.
G06F 17/50 (2006.01)

(52) U.S. Cl.
CPC ...... *G06F 17/5081* (2013.01); *G06F 17/5072* (2013.01); *G06F 2217/12* (2013.01)

(58) Field of Classification Search
USPC ......................................................... 716/52
See application file for complete search history.

(56) References Cited

U.S. PATENT DOCUMENTS

| | | |
|---|---|---|
| 8,601,416 B2 | 12/2013 | Kuo et al. |
| 8,762,900 B2 | 6/2014 | Shin et al. |
| 8,775,993 B2 | 7/2014 | Huang et al. |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 2014/0237435 A1 | 8/2014 | Chen et al. |
| 2014/0304670 A1 | 10/2014 | Su et al. |
| 2015/0095865 A1* | 4/2015 | Bhattacharya ...... G03F 7/70466 716/112 |
| 2015/0213185 A1* | 7/2015 | Hensel ................ G06F 17/5081 716/112 |
| 2015/0278419 A1 | 10/2015 | Yang et al. |
| 2015/0370937 A1 | 12/2015 | Liu et al. |
| 2015/0370945 A1 | 12/2015 | Lee |

* cited by examiner

*Primary Examiner* — Bryce Aisaka
(74) *Attorney, Agent, or Firm* — Sterne, Kessler, Goldstein & Fox P.L.L.C.

(57) ABSTRACT

The present disclosure is directed to a method for triple-patterning friendly placement. The method can include creating cell attributes identifying potential risk for triple-patterning design rule checking (TP DRC) violations in both a vertical and a horizontal propagation in a placement region. Based on these cell attributes, placement blockages can be inserted to prevent TP DRC violations after cell placement.

20 Claims, 7 Drawing Sheets

METHOD FOR TRIPLE-PATTERNING FRIENDLY PLACEMENT

BACKGROUND

Conventional techniques for resolving design rule checking (DRC) violations due to triple-patterning (TP) lithography constraints include adopting placement abutment rules to prevent triple-patterning DRC violations. In addition, or in the alternative, post-placement-fixing techniques can be implemented to resolve any DRC violations that still exist after placement.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
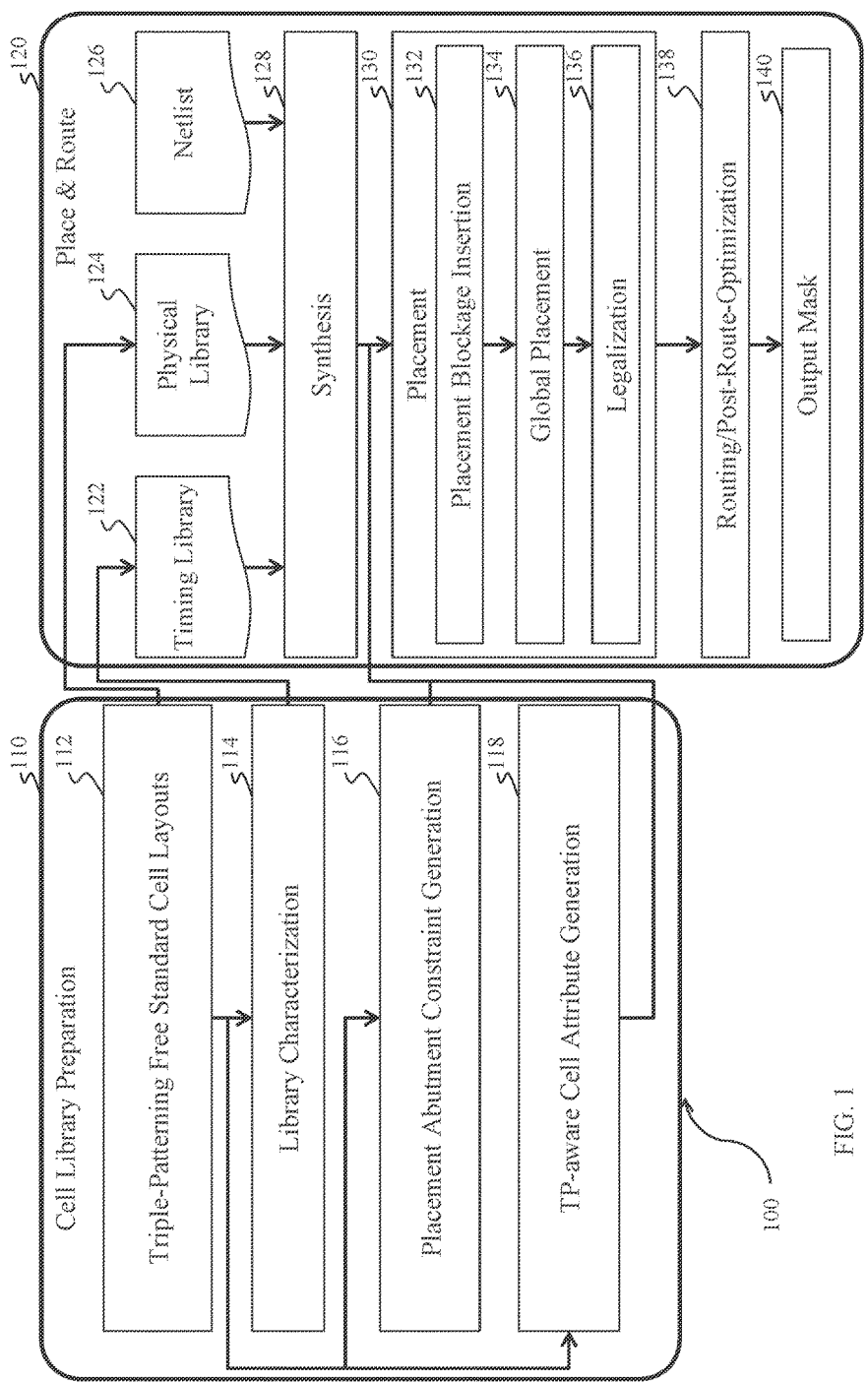
FIG. 1 illustrates an example process for triple-patterning placement, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

The present disclosure is directed to a design optimization methodology for placing cells from a cell library into a chip design, where various placement combinations of those cells can result in a triple-patterning design rule checking (TP DRC) violation. According to aspects of the present disclosure, cell attributes with potential risk of TP DRC violations are created for each cell and placement blockages are inserted to prevent TP DRC violations after cell placement. In this way, embodiments in accordance with aspects of the present disclosure can be used to prevent TP DRC violations caused by standard cell layout patterns. Furthermore, the present disclosure provides for triple-patterning placement with shorter design turn-around time and also provides for smaller design area and cost.

FIG. 1 illustrates an example process for triple-patterning placement, in accordance with some embodiments. A process for triple-patterning placement 100 includes two primary operations: (1) cell library preparation 110; and (2) place and route 120. According to aspects of the present disclosure, library preparation 110 includes: (1) triple-patterning-free standard cell layout generation 112; (2) library characterization 114; (3) placement abutment constraint generation 116; and (4) triple-patterning aware ("TP-aware") cell attribute generation 118.

Triple-patterning-free standard cell layout generation 112 can include defining cell pre-coloring and placement requirements. A triple-patterning-free standard cell is a standard cell that is triple-patterning decomposable. The triple-patterning-free standard cell can be checked using pre-coloring layouts and determining whether any triple-patterning violations have occurred. In some embodiments, triple-patterning violations between different standard cells can be detected and prevented as described herein.

According to some aspects of the present disclosure, defining the pre-coloring and placement requirements avoids any conflicts between cells in different rows. For example, triple-patterning cell layouts assign various features on a given layout layer in the cell layout to different ones of a set of triple-patterning masks such that two features that are too close are assigned to different masks.

Library characterization 114 can include creating a set of models for a standard cell library that accurately and efficiently model cell behavior. Library characterization 114 can be based on: (1) cell functions, e.g., logic gates; (2) process options, e.g., mask layer options, gate shrinks, number of metals, special diffusions, thick metal, multiple oxides; (3) cell options, e.g., drive strengths, sets, resets, scans, substrate ties, antenna diodes, etc.; and/or (3) addressing tradeoffs, e.g., tradeoffs between high speed, high density, low power, low leakage, low voltage, low noise.

Placement abutment constraint generation 116 can include generating constraints to define which cells are to be adjacent to one another. Placement abutment constraint generation 116 can include generating placement rules such that two standard cells should not be placed neighboring to each other. That is, placement abutment constraint generation 116 provides for sufficient empty space between two standard cells. In some embodiments, placement abutment constraint generation 116 can be pre-defined according to process rules or based on pin accessibility or standard cells.

TP-aware cell attribute generation 118 can be performed to create cell attribute(s) with potential risk to incur TP DRC violations. According to aspects of the present disclosure, TP-aware cell attribute generation 118 includes identifying cells with potential risk for TP DRC violations in a vertical direction, a horizontal direction, or both. For example, cells with potential risk to incur TP DRC violations due to vertical propagation on same-mask minimum spacing violations are identified as TP-V cells. Similarly, cells with potential risk for TP DRC violations due to horizontal propagation on same-mask minimum spacing violations are identified as TP-H cells. According to further aspects of the present disclosure, cells having both TP-V and TP-H attributes are identified as TP-VH cells.

In various embodiments, placement sites include discrete, regular locations for cell placement. Cell positions can be aligned with placement sites and a cell width is typically a multiple of placement sites. Additionally, neighboring sites might include patterns that introduce same-mask minimum spacing violations.

TP-aware cell attribute generation 118 can include determining whether a cell has one or more potential TP DRC violations on an upper portion of the cell and/or a lower portion of the cell, i.e., TP-V cell determination. For example, given a triple-patterning same-mask minimum spacing T0, the cell may have a TP-V-T-i, e.g., an upper portion violation at the ith placement site, if there is at least one triple-patterning pattern on the ith placement site having a spacing to a cell top boundary of<½ T0. In other words, when a placement site has a triple-patterning site within one half of the minimum spacing T0 from the top boundary of the cell, the placement site is identified as an upper portion violation. Accordingly, a cell attribute identifying the upper portion violation is added to a profile of the cell.

Similarly, in embodiments, the cell may have a TP-V-B-i, e.g., a lower portion violation at the ith placement site, if there is at least one triple-patterning pattern on the ith placement site having a spacing to a cell bottom boundary of <½ T0. In other words, when a placement site has a feature that is potentially a triple-patterning rule violator within one half of the minimum spacing T0 from the bottom boundary of the cell, the placement site is identified as a lower portion violation. Accordingly, a cell attribute identifying the lower portion violation is added to a profile of the cell. According to aspects of the present disclosure, a cell may have one or more upper portion violations in addition to one or more lower portion violations.

Figure 2:
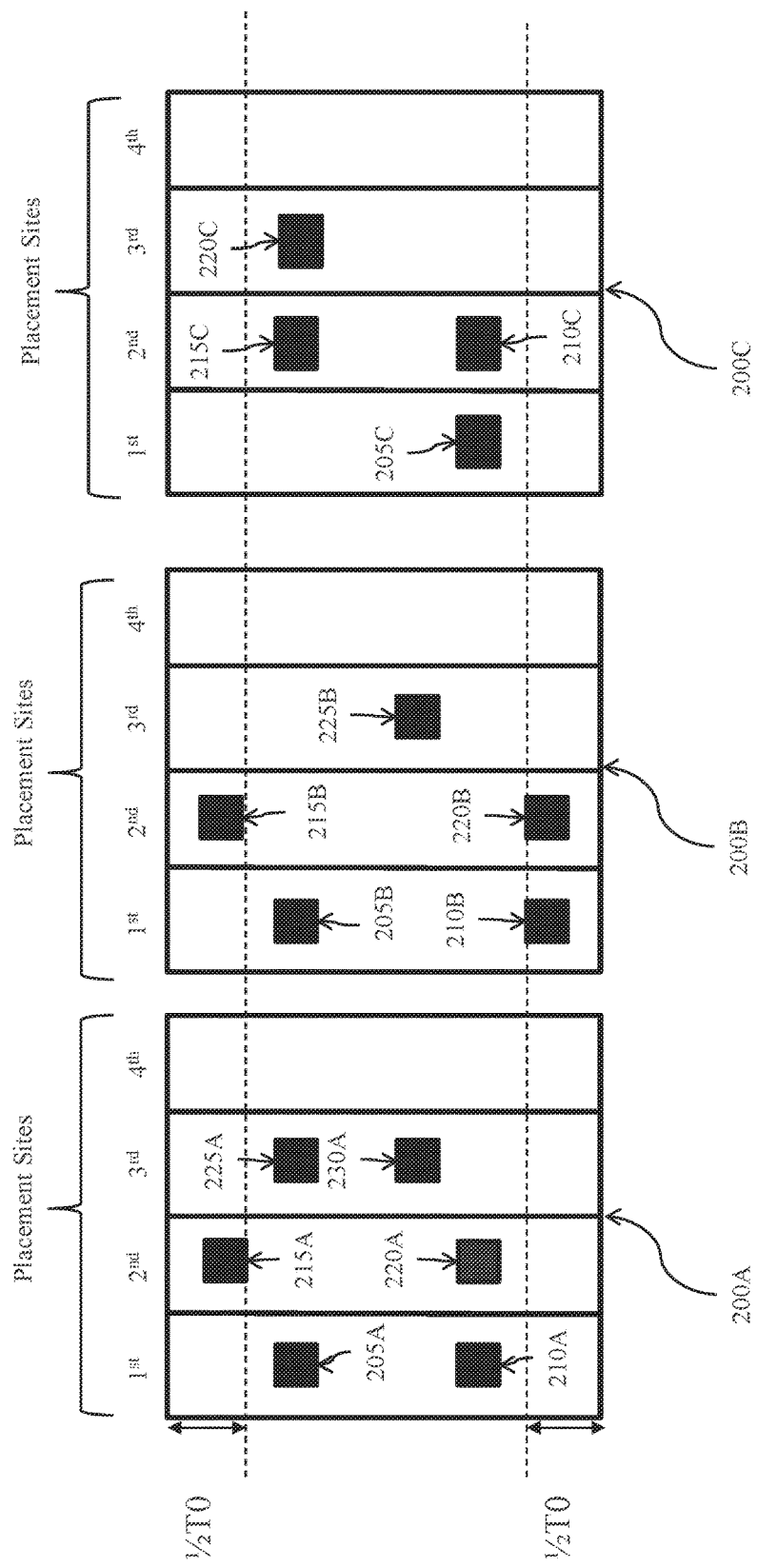
FIG. 2 illustrates high-level examples of triple-patterning design rule checking violations due to vertical propagation, in accordance with some embodiments.

FIG. 2 illustrates high-level examples of TP DRC violations due to vertical propagation, in accordance with some embodiments. For example, FIG. 2 illustrates cells 200A through 200C each having a plurality of placement sites 1 through 4. Although FIG. 2 illustrates cells 200A through 200C as having four placement sites, a person of ordinary skill in the art would understand that any number of placement sites is further contemplated by the present disclosure. Cell 200A includes a plurality of placement patterns 205A through 230A. Pattern 215A is located within ½ T0 of the upper cell boundary within placement site 2. Accordingly, a cell attribute TP-V-T-2 indicating a potential vertical violation in the upper portion of placement site 2 is added to a cell 200A.

As further illustrated in FIG. 2, cell 200B includes a plurality of placement patterns 205B through 225B. Pattern 215B is located within ½ T0 of the upper cell boundary within placement site 2 and patterns 210B and 220B are located within ½ T0 of the lower cell boundary within placement sites 1 and 2, respectively. Accordingly, the cell attributes TP-V-T-2, TP-V-B-1, and TP-V-B-2 indicating a vertical violations in the upper and bottom portions of placement sites 1 and 2, respectively, are added to cell 200B.

Cell 200C includes a plurality of placement patterns 205C through 220C; however, in contrast to cells 200A and 200B, none of the patterns 205C through 220C are located within either ½ T0 of the upper cell boundary or ½ T0 of the lower cell boundary. Therefore, cell 200C is clear of any potential TP DRC violations in the vertical propagation, and as such, no attributes are added to cell 200C.

In some embodiments, TP-aware cell attribute generation 118 includes determining whether there is a path from a first group of patterns to a second group of patterns through a third group of patterns, e.g., TP-H cell determination. For example, for a given triple-patterning same-mask minimum spacing T0, patterns, any part of which is within <½ T0 spacing to cell left boundary are grouped in the first group of patterns VL and patterns, any part of which is within <½ T0 spacing to cell right boundary are grouped in the second group of patterns VR. To form the third group of patterns, patterns inside a cell within >½ T0 spacing to cell left or right boundaries are initially grouped together to form VI patterns. In embodiments, VI patterns having three or more neighboring VL, VR or VI patterns with spacing <T0 are grouped together to form the third group of patterns VP. A TP-H attribute can be added to a cell when there is a path from a VL pattern through one or more VP patterns to a VR pattern.

Figure 3:
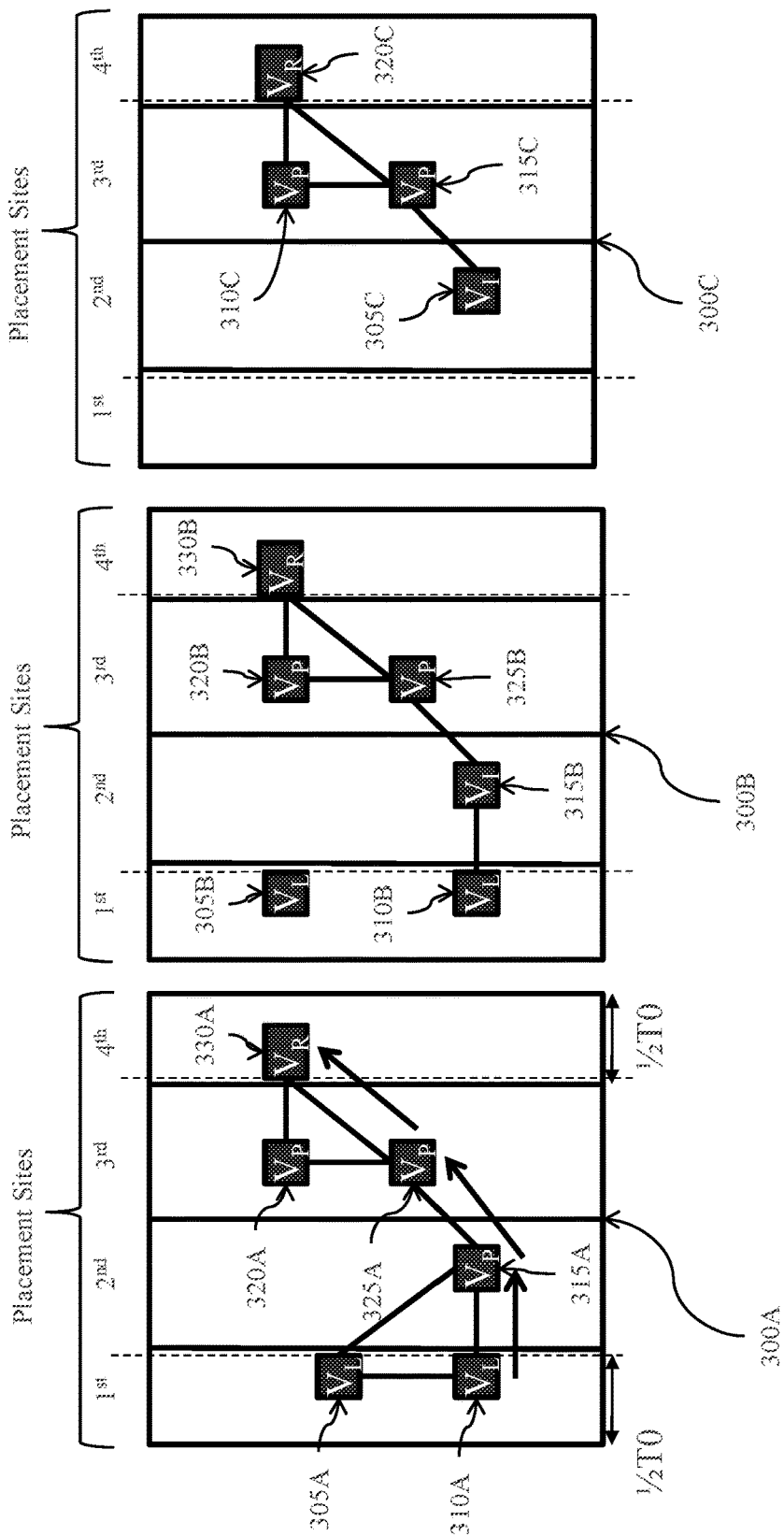
FIG. 3 illustrates high-level examples of triple-patterning design rule checking violations due to horizontal propagation, in accordance with some embodiments.

FIG. 3 illustrates high-level examples of TP DRC violations due to horizontal propagation. For example, cells 300A through 300C each have a plurality of placement sites 1 through 4. Although cells 300A through 300C have four placement sites, a person of ordinary skill in the art would understand that any number of placement sites is contemplated by the present disclosure. Cell 300A includes a plurality of patterns 305A through 330A. Patterns 305A and 310A are located within ½ T0 of the left cell boundary, and as such, patterns 305A and 310A can be grouped as VL patterns. Furthermore, pattern 330A is located within ½ T0 of the right cell boundary, and as such, pattern 330A can be grouped as a VR pattern. Patterns 315A through 325A are located within >½ T0 spacing to cell left or right boundaries and are initially grouped together to form VI patterns. However, patterns 315A through 325A have three or more neighboring VL, VR or VI patterns with spacing <T0, and as such, patterns 315A through 325A are grouped together to form VP patterns. A path exists from pattern 305A, e.g., a VL pattern, to pattern 330A, e.g., a VR pattern, through patterns 315A through 325A, e.g., a group of VP patterns, and as such, a cell attribute TP-H indicating a potential horizontal violation is added to a cell 300A.

Still referring to FIG. 3, cell 300B includes a plurality of patterns 305B through 330B. Much like cell 300A, patterns 305B and 310B can be grouped as VL patterns, pattern 330B can be grouped as a VR pattern, and patterns 315B through 325B are initially grouped together to form VI patterns. However, pattern 315B does not have three or more neighboring VL, VR or VI patterns with spacing <T0, whereas patterns 320B and 325B have three or more neighboring VL, VR or VI patterns with spacing <T0. As such, pattern 315B is not grouped as a VP pattern and patterns 320B and 325B are grouped together to form the VP patterns. No path exists from patterns 305B or 310B, e.g., VL patterns, to pattern site 330B, e.g., a VR pattern, through a group of VP patterns because 315B is only a VI pattern and thus disrupts the path. As such, no cell attribute TP-H indicating a potential horizontal violation is added to a cell 300B. Unlike cells 300A and 300B, cell 300C does not include any patterns that can be grouped as a VL pattern. Consequently, no path exists from a VL pattern to a VR pattern, and as such, no cell attribute TP-H indicating a potential horizontal violation is added to cell 300C.

Figure 4:
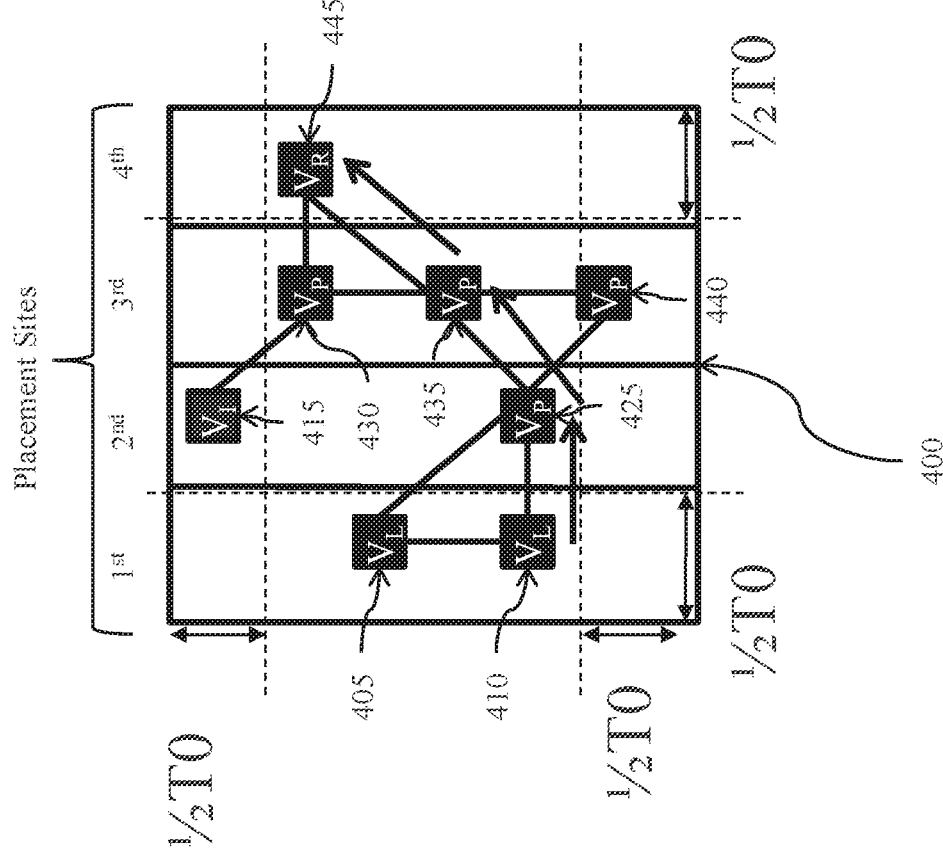
FIG. 4 illustrates high-level examples of triple-patterning design rule checking violations due to both vertical and horizontal propagation, in accordance with some embodiments.

FIG. 4 illustrates high-level examples of TP DRC violations due to both vertical and horizontal propagation. For example, a cell 400 having a plurality of placement sites 1 through 4 and includes a plurality of patterns 405 through 445. Although cell A has four placement sites, a person of ordinary skill in the art would understand that any number of placement sites is contemplated by the present disclosure. Patterns 405 and 410 are located within ½ T0 of the left cell boundary, and as such, patterns 405 and 410 can be grouped as VL patterns. Furthermore, pattern 445 is located within ½ T0 of the right cell boundary, and as such, pattern 445 can be grouped as a VR pattern. Patterns 415 through 440 are located within >½ T0 spacing to cell left or right boundaries and are initially grouped together to form VI patterns. Patterns 415 through 440 have three or more neighboring VL, VR or VI patterns with spacing <T0, and as such, patterns 425 through 440 are grouped together to form the VP patterns. As illustrated in FIG. 4, a path exists from pattern 410, e.g., a VL pattern, to pattern 445, e.g., a VR pattern, through patterns 425 and 435, e.g., a group of VP patterns, and as such, a cell attribute TP-H indicating a potential horizontal violation is added to cell 400.

Still referring to FIG. 4, pattern 415 is located within ½ T0 of the upper cell boundary within placement site 2 and pattern 440 is located within ½ T0 of the lower cell boundary within placement site 3. Accordingly, the cell attributes TP-V-T-2 and TP-V-B-3 indicating vertical violations in the upper and bottom portions, respectively, are added to cell 400.

As discussed above, process 100 includes place and route operation 120. Place and route 120 uses a timing library 122, a physical library 124, and a netlist 126. Timing library 122 can be based on library characterization 114 and can contain timing information, e.g., rise and fall times of cell outputs, and propagation delay through a cell for different combinations of input signals for each of a collection of in the cell library.

Physical library 124 can be based on triple-patterning-free standard layouts 112. According to aspects of the present disclosure, physical library 124 can include one or more library of cells, each respective library of cells complies with DRC requirements. The cell layout, in this context, is a graphical representation the desired physical layout of structures on a chip. The graphical representation is used to make masks, or reticles, which are used, in turn to lithographically pattern various features of a chip. A process design kit (PDK) can be used in generating physical library 124. In some embodiments, the PDK file can include, but is not limited to, a plurality of device models that are assigned to a respective plurality of devices. For example, the devices can include an n-type metal-oxide-semiconductor field effect transistor (MOSFET), a p-type MOSFET, a p/n junction diode, a resistor, a capacitor, an inductor, a bipolar transistor, a high-voltage (HV) device, and/or other semiconductor devices.

Netlist 126 can be based on a schematic that is entered into a schematic capture system. The netlist can also be generated from a hardware description language (HDL) model, e.g., Verilog and VHDL, of the desired circuit. In some embodiments, the netlists can be generated on a platform, such as VIRTUOSO® commercially available from CADENCE DESIGN SYSTEMS, Inc. (San Jose, Calif.). For example, the PDK file can be used to generate a netlist for the pre-layout simulation. In some embodiments the pre-layout simulation is a static timing analysis. In embodiments, the netlist can be referred to as, for example, a transistor netlist or a gate-level netlist. In some embodiments, generating the netlists includes performing schematic entry. In alternative embodiments, generating the netlists includes synthesizing a logic circuit design.

Process 100 also includes designing an integrated circuit by performing a pre-place and route synthesis 128 using timing library 122, physical library 124, and netlist 126. Circuit simulations are typically performed during the course of designing cells for a library of cells. Once characterized cells are available, a timing analysis can be performed in addition to, or in place of further circuit simulation. In some embodiments, the pre-place and route simulation, i.e., timing analysis, can be based on estimates of the circuit's parasitic loading.

After performing synthesis 128, process 100 further includes a placement 130, which includes placing the plurality of cells in a chip design based on pre-place and route synthesis 128, placement abutment constraint generation 116, and TP-aware cell attribute generation 118. Placement 130 further includes three sub-stages: (1) placement blockage insertion 132; (2) global placement 134; and (3) legalization 136.

Placement blockage insertion 132 includes creating placement blockage(s) to prevent conflict edge propagation vertically or horizontally in a cell. Placement blockage insertion 132 includes a TP-V blockage and/or TP-H blockage based on the cell attributes generated in TP-aware cell attribute generation 118. According to aspects of the present disclosure, TP-V blockage includes inserting a blockage on a placement site which cannot overlap with other TP-V blockage. According to further aspects of the present disclosure, TP-H blockage includes inserting a blockage which cannot overlap with any TP-H (or TP-VH) cells. In some embodiments, the TP-V blockages and/or the TP-H blockages have width equal to a width of one placement site and a height less than or equal to a height of one placement site height.

Figure 5:
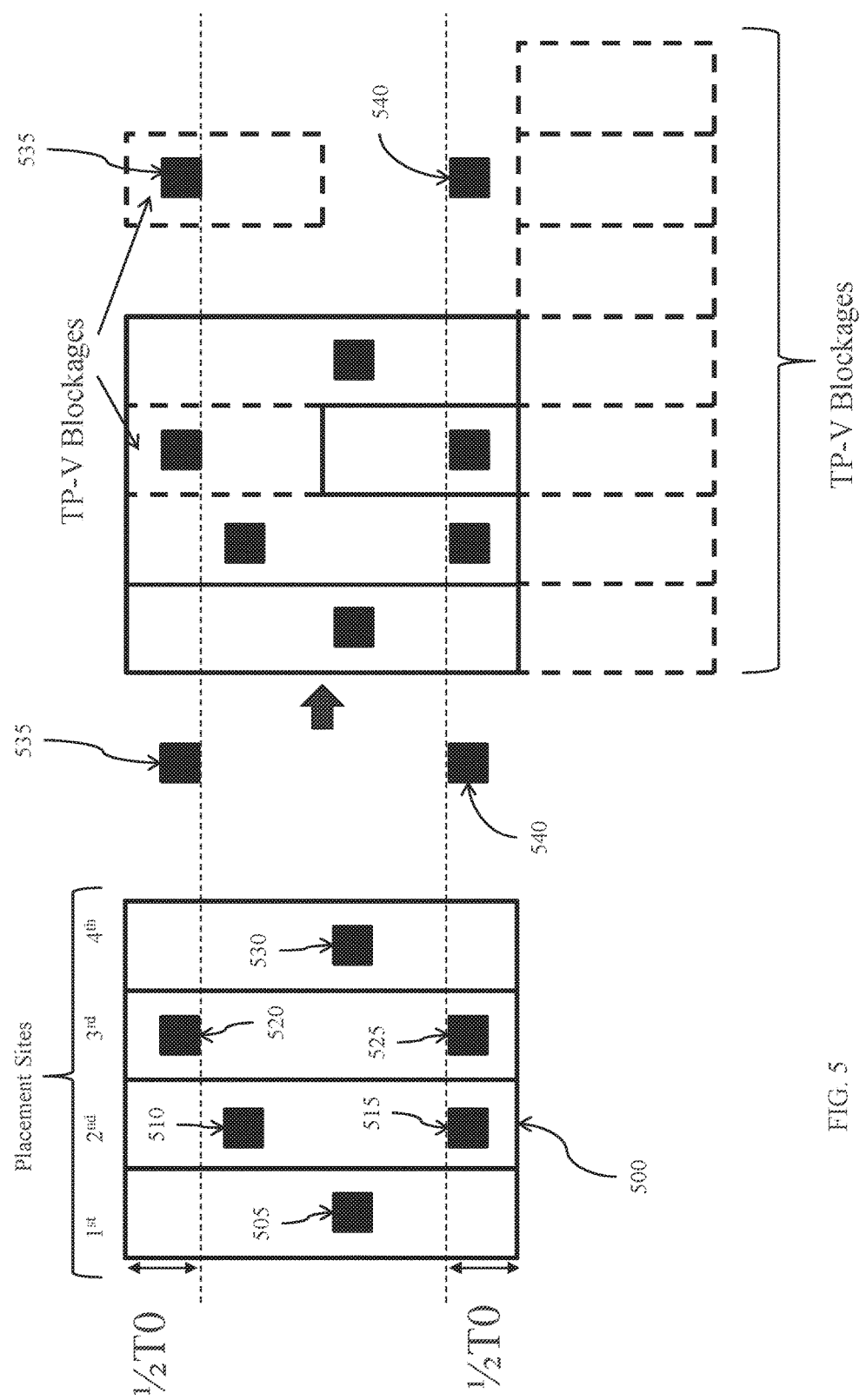
FIG. 5 illustrates an exemplary implementation of placement blockage insertion, in accordance with some embodiments.

FIG. 5 illustrates an exemplary implementation of placement blockage insertion 132, in accordance with some embodiments. A cell 500 includes 4 placement site 1 through 4 and includes a plurality of patterns 505 through 530. Cell 500 includes the cell attributes TP-V-T-3, TP-V-B-2, and TP-V-B-3 as would be understood based on the description of the operations for identifying TP DRC violations in a vertical propagation, as described herein. Namely, patterns 515 through 525 are located within ½ T0 spacing to the placement site top or bottom boundary in the second and third placement sites, respectively, and as such, the cell attributes TP-V-T-3, TP-V-B-2, and TP-V-B-3 are added to cell 500. In various embodiments, a placement region may also include one or more pre-placed patterns. For example, FIG. 5 illustrates a pre-placed pattern 535 within <½ T0 spacing to placement site top boundary and a pre-placed pattern 540 within <½ T0 spacing to placement site bottom boundary.

In some embodiments, placement blockage insertion 132 can include creating a TP-V blockage. The TP-V blockage can include creating a blockage on the corresponding ith placement site within the cell for each TP-V-T-i attribute. In the example of FIG. 5, a TP-V blockage can be inserted on the upper portion of placement site 3. In further embodiments, the TP-V blockage can include creating blockages under the bottom boundary of the ith placement site and its neighboring placement sites for each cell with TP-V-B-i attribute. In the example of FIG. 5, TP-V blockages can be placed under placement sites 2 and 3 in addition to their respective neighbor placement sites, e.g., placement sites 1 and 4.

In still further embodiments, the TP-V blockage can include creating a blockage on the corresponding placement site for each pre-placed pattern within <½ T0 spacing to placement site top boundary, e.g., over pre-placed pattern 535, as shown in FIG. 5. Additionally, in some embodiments, the TP-V blockage can include creating blockages under the bottom boundary of the corresponding placement site for each pre-placed pattern within <½ T0 spacing to placement site bottom boundary and its respective neighboring placement sites, e.g., pre-placed pattern 540 and its neighboring sites, as shown in FIG. 5.

Figure 6:
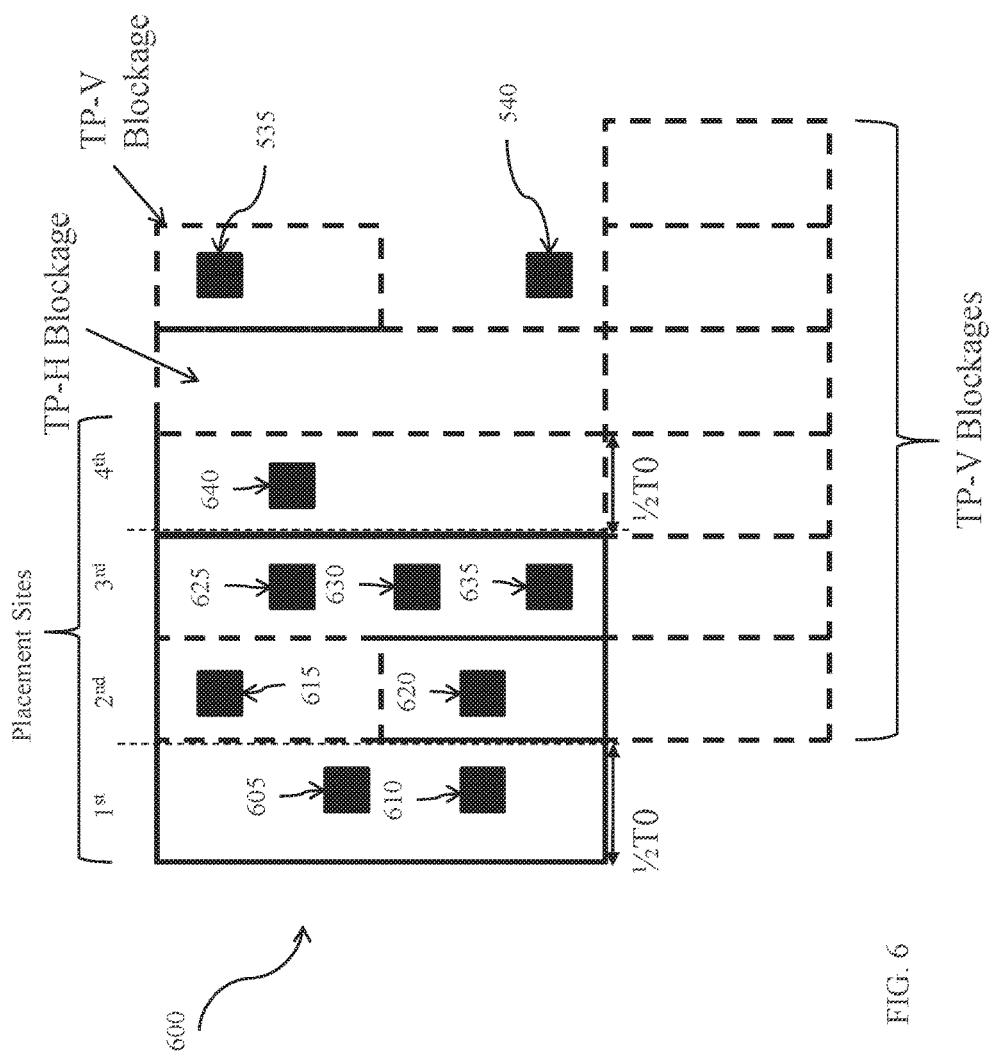
FIG. 6 illustrates an exemplary implementation of placement blockage insertion, in accordance with some embodiments.

Placement blockage insertion 132 can also include creating a TP-H blockage. FIG. 6 illustrates an exemplary implementation of placement blockage insertion 132. For example, a cell 600 includes 4 placement sites 1 through 4 and includes a plurality of patterns 605 to 640. Cell 600 includes the cell attribute TP-H as would be understood based on the description of at least FIG. 3. In some embodiments, TP-H blockage can include creating a blockage on a neighbor placement site when a cell, e.g., cell 600, has the cell attribute TP-H. In further embodiments, TP-H blockage can include creating a blockage on the left or right neighboring placement sites for each pre-placed pattern in the placement region, e.g., pre-placed patterns 535 and 540.

Referring to FIG. 1, global placement 134 includes placing the cells distributed over a chip region with overlaps. During global placement 134, a placement tool can be used to generate an automatic placement of the cells with approximately regular cell densities while minimizing wirelength. Global placement 134 can utilize partitioning-based techniques, simulated annealing-based techniques, or analytical placement techniques, or any combination thereof, as would be understood by those of ordinary skill in the art.

After global placement, cells may still overlap and may be misaligned with the row. To remedy the overlap and the misalignment, legalization 136 includes removing any remaining overlaps between the cells and aligning all the cells, e.g., legalization 136 legalizes global placement 134. That is, legalizations 136 is used to place cells at legal placement sites and remove overlaps. In this way, legalization 136 removes any white spaces in the layout and reduces the overall wire-length.

Routing/post-route optimization 138 includes routing a metal layer, e.g., a metal wiring, between the cells. According to aspects of the present disclosure, routing/post-route optimization 138 includes inserting placers based on placement blockage insertion 132 to prevent overlaps between the TP-V blockages, between the TP-H blockages, and/or TP-H/TP-VH cells. Routing/post-route optimization 138 can include routing a metal wiring on a single layer. Alternatively, or additionally, routing/post-route optimization 138 can include routing a metal wiring between multiple layers. In various embodiments, the inter-layer wiring can be performed using interconnects such as vias or any other known interconnect.

Process 100 further includes outputting the layout to a machine readable storage medium, wherein the outputted layout is used to manufacture a set of masks used in the photolithography operations of integrated circuit fabrication at operation 140. In embodiments, outputting the layout can be performed when the LVS check is clean.

Figure 7:
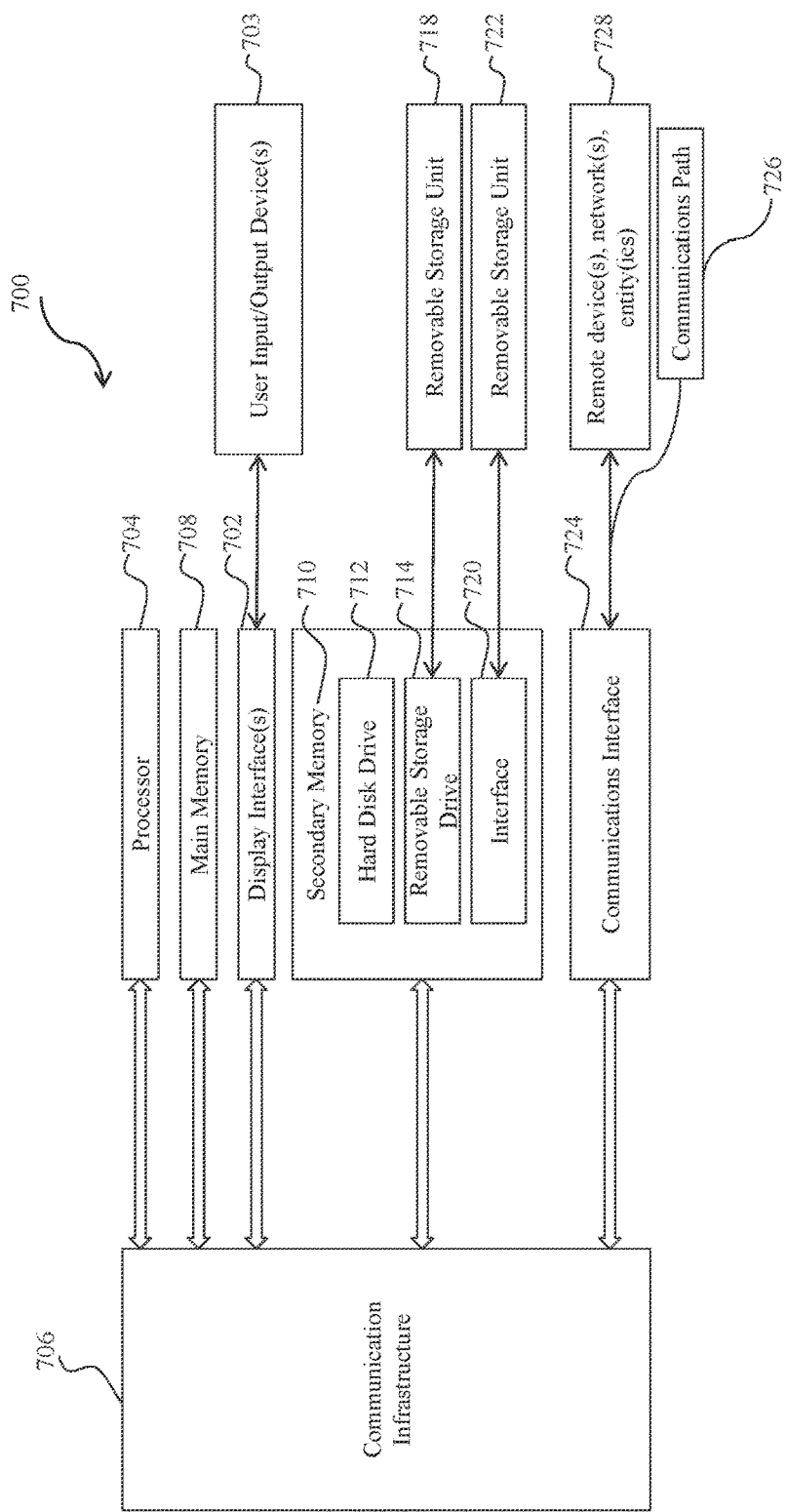
FIG. 7 is high-level block diagram of an example computer system, in accordance with some embodiments.

Various aspects of the exemplary embodiments may be implemented in software, firmware, hardware, or a combination thereof. FIG. 7 is an illustration of an example computer system 700 in which embodiments of the present disclosure, or portions thereof, can be implemented as computer-readable code. For example, the methods illustrated by FIG. 1 can be implemented in system 700. Various embodiments of the present disclosure are described in terms of this example computer system 700. After reading this description, it will become apparent to a person skilled in the relevant art how to implement embodiments of the present disclosure using other computer systems and/or computer architectures.

Computer system 700 includes one or more processors, such as processor 704. Processor 704 is connected to a communication infrastructure 706 (e.g., a bus or network).

Computer system 700 also includes a main memory 708, such as random access memory (RAM), and may also include a secondary memory 710. Secondary memory 710 can include, for example, a hard disk drive 712, a removable storage drive 714, and/or a memory stick. Removable storage drive 714 can include a floppy disk drive, a magnetic tape drive, an optical disk drive, a flash memory, or the like. Removable storage drive 714 reads from and/or writes to a removable storage unit 718 in a well-known manner. Removable storage unit 718 can include a floppy disk, magnetic tape, optical disk, flash drive, etc., which is read by and written to by removable storage drive 714. As will be appreciated by persons skilled in the relevant art, removable storage unit 718 includes a computer-readable storage medium having stored therein computer software and/or data. Computer system 700 includes a display interface 702 (which can include input and output devices 703 such as keyboards, mice, etc.) that forwards graphics, text, and other data from communication infrastructure 706 (or from a frame buffer not shown).

In alternative implementations, secondary memory 710 can include other similar devices for allowing computer programs or other instructions to be loaded into computer system 700. Such devices can include, for example, a removable storage unit 722 and an interface 720. Examples of such devices include a program cartridge and cartridge interface (such as those found in video game devices), a removable memory chip (e.g., EPROM or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices. Communications interface 724 can include a modem, a network interface (such as an Ethernet card), a communications port, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and can be implemented using wire or cable, fiber optics, a phone line, a cellular phone link, a RF link or other communications channels.

In this document, the terms "computer program storage medium" and "computer-readable storage medium" are used to generally refer to non-transitory media such as removable storage unit 718, removable storage unit 722, and a hard disk installed in hard disk drive 712. Computer program storage medium and computer-readable storage medium can also refer to memories, such as main memory 708 and secondary memory 710, which can be semiconductor memories (e.g., DRAMs, etc.). Embodiments of the present disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, floppy disks, CD ROMS, ZIP disks, tapes, magnetic storage devices, optical storage devices, MEMS, nanotechnological storage devices, etc.).

These computer program products provide software to computer system 700. Embodiments of the present disclosure are also directed to computer program products including software stored on any computer-readable storage medium. Such software, when executed in one or more data processing devices, causes a data processing device(s) to operate as described herein.

Computer programs (also called computer control logic) are stored in main memory 708 and/or secondary memory 710. Computer programs may also be received via communications interface 724. Such computer programs, when executed, enable computer system 700 to implement various embodiments of the present disclosure. In particular, the computer programs, when executed, enable processor 704 to implement processes of embodiments of the present disclosure, such as the operations in the methods illustrated by FIG. 1 in system 700. Where embodiments of the present disclosure are implemented using software, the software can be stored in a computer program product and loaded into computer system 700 using removable storage drive 714, interface 720, hard drive 712, or communications interface 724.

As described herein, the present disclosure is directed to a method for triple-patterning friendly placement. The method can include creating cell attributes identifying potential risk on triple-patterning DRC violations in both a vertical and horizontal propagation in a placement region. Based on these cell attributes, placement blockages can be inserted to prevent triple-patterning DRC violations after cell placement. In this way, the present disclosure can be used to achieve triple-patterning friendly placement with shorter design turn-around time and to achieve smaller design area and cost.

In one embodiment, a method for triple-patterning placement includes identifying one or more triple-patterning design rule checking ("DRC") violations in a placement region. The method also includes inserting one or more placement blockages based on the identified one or more triple-patterning design rule checking violations. Additionally, the method includes placing a plurality of cells in a chip design to provide a design layout. Lastly, the method includes outputting the design layout to a machine readable storage medium, wherein the outputted design layout being configured to manufacture a set of masks used in integrated circuit fabrication processes.

In a second embodiment, an article of manufacture includes a non-transitory computer readable medium having computer program logic stored thereon that, when executed by a computing device, causes the computing device to perform operations for triple-patterning placement. The operations include identifying one or more triple-patterning design rule checking (DRC) violations in a placement region. The operations also include inserting one or more placement blockages based on the identified one or more triple-patterning design rule checking violations. Additionally, the operations include placing a plurality of cells in a chip design to provide a design layout. Lastly, the operations include outputting the design layout to a machine readable storage medium, wherein the outputted layout being configured to manufacture a set of masks used in integrated circuit fabrication processes.

In a third embodiment, a system for generating a detailed placement includes a memory that stores instructions for generating a detailed placement and a processor. The processor is configured to identify a cell with one or more triple-patterning DRC violations in at least one of a vertical direction or a horizontal direction. The processor is also configured to insert one or more placement blockages based on the identified one or more triple-patterning design rule checking violations. Additionally, the processor is configured to place a plurality of cells in a chip design to provide a design layout. Lastly, the processor is configured to output the design layout to a machine readable storage medium, wherein the outputted design layout is configured to manufacture a set of masks used in integrated circuit fabrication processes.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for triple-patterning placement, the computer-implemented method comprising:
identifying one or more cells within a chip design that includes a plurality of cells with potential risks of violating one or more triple-patterning design rule checking ("TP DRC") rules in a placement region;
adding one or more attributes to a profile of each identified cell;
inserting one or more placement blockages based on the attributes of the each identified cell to produce a design layout; and
manufacturing a set of masks used in integrated circuit fabrication processes based on the design layout.

2. The method of claim 1, wherein identifying one or more cells within a chip design that includes a plurality of cells with potential risks of violating one or more triple-patterning design rule checking ("TP DRC") rules comprises:
identifying a cell with the one or more triple-patterning DRC violations in at least one of a vertical direction or a horizontal direction.

3. The method of claim 2, wherein identifying the cell with the triple-patterning DRC violations in the vertical direction comprises:
determining whether one or more patterns of the cell are located within a pre-defined spacing to a cell top boundary or within a pre-defined spacing of a cell bottom boundary; and
adding a cell attribute to the profile of the cell, wherein the cell attribute indicates the one or more triple-patterning DRC violations are located within the pre-defined spacing to the cell top boundary or within the pre-defined spacing of the cell bottom boundary.

4. The method of claim 3, wherein when the cell attribute indicates the one or more triple-patterning DRC violations are located within the pre-defined spacing to the cell top boundary, the inserting one or more placement blockages comprises:
inserting a placement blockage from among the one or more placement blockages on a corresponding placement site within the cell.

5. The method of claim 3, wherein when the cell attribute indicates the one or more triple-patterning DRC violations are located within the pre-defined spacing to the cell bottom boundary, the inserting one or more placement blockages comprises:
  inserting a placement blockage from among the one or more placement blockages under the cell bottom boundary of a corresponding placement site and one or more neighboring placement sites.

6. The method of claim 2, wherein identifying the cell with the triple-patterning DRC violations in the horizontal direction comprises:
  determining whether a path exists from a first group of patterns to a second group of patterns through a third group of patterns, wherein the first group of patterns is located within a pre-defined spacing to a cell left boundary, the second group of patterns is located within the predefined spacing to a cell right boundary, and the third group of patterns is located in a region between the first group of patterns and the second group of patterns; and
  adding a cell attribute to the profile of the cell, wherein the cell attribute indicates that the one or more triple-patterning DRC violations exists in the horizontal direction when the path exists.

7. The method of claim 6, wherein the inserting one or more placement blockages comprises:
  inserting a placement blockage from among the one or more placement blockages on a neighbor placement site when the cell attribute indicates that the one or more triple-patterning DRC violations exists in the horizontal direction.

8. An article of manufacture comprising a non-transitory computer readable medium having computer program logic stored thereon that, when executed by a computing device, causes the computing device to perform operations for triple-patterning placement, the operations comprising:
  identifying one or more cells within a chip design that includes a plurality of cells with potential risks of violating one or more triple-patterning design rule checking (TP DRC) rules in a placement region;
  adding one or more attributes to a profile of each identified cell;
  inserting one or more placement blockages based on the attributes of the each identified cell to produce a design layout;
  and
  manufacturing a set of masks used in integrated circuit fabrication processes based on the design layout.

9. The article of manufacture of claim 8, wherein identifying one or more cells within a chip design that includes a plurality of cells with potential risks of violating one or more triple-patterning design rule checking (TP DRC) rules comprises:
  identifying a cell with the one or more triple-patterning DRC violations in at least one of a vertical direction or a horizontal direction.

10. The article of manufacture of claim 9, wherein identifying the cell with the triple patterning DRC violations in the vertical direction comprises:
  determining whether one or more patterns is located within a pre-defined spacing to a cell top boundary or within a pre-defined spacing of a cell bottom boundary; and
  adding a cell attribute to the profile of the cell, wherein the cell attribute indicates the one or more triple-patterning DRC violations are located within the pre-defined spacing to the cell top boundary or within the pre-defined spacing of the cell bottom boundary.

11. The article of manufacture of claim 10, wherein when the cell attribute indicates the one or more triple-patterning DRC violations are located within the pre-defined spacing to the cell top boundary, the inserting one or more placement blockages comprises:
  inserting a placement blockage from among the one or more placement blockages on a corresponding placement site within the cell.

12. The article of manufacture of claim 10, wherein when the cell attribute indicates the one or more triple-patterning DRC violations are located within the pre-defined spacing to the cell bottom boundary, the inserting one or more placement blockages comprises:
  inserting a placement blockage from among the one or more placement blockages under the cell bottom boundary of a corresponding placement site and one or more neighboring placement sites.

13. The article of manufacture of claim 9, wherein identifying the cell with the triple patterning DRC violations in the horizontal direction comprises:
  determining whether a path exists from a first group of patterns to a second group of patterns through a third group of patterns, wherein the first group of patterns is located within a pre-defined spacing to a cell left boundary, the second group of patterns is located within the predefined spacing to a cell right boundary, and the third group of patterns is located in a region between the first group of patterns and the second group of patterns; and
  adding a cell attribute to the profile of the cell, wherein the cell attribute indicates that the one or more triple-patterning DRC violations exists in the horizontal direction when the path exists.

14. The article of manufacture of claim 13, wherein the inserting one or more placement blockages comprises:
  inserting a placement blockage from among the one or more placement blockages on a neighbor placement site when the cell attribute indicates that the one or more triple-patterning DRC violations exists in the horizontal direction.

15. A system for generating a detailed placement, the system comprising:
  a memory that stores instructions for triple-patterning placement;
  a processor configured to:
    identify a cell within a chip design that includes a plurality of cells with potential risks of violating one or more triple-patterning DRC rules in at least one of a vertical direction or a horizontal direction;
    add one or more attributes to a profile of the cell;
    insert one or more placement blockages based on the attributes of the identified cell to produce a design layout;
    and
    output the design layout to a machine readable storage medium, wherein the outputted design layout is configured to manufacture a set of masks used in integrated circuit fabrication processes;
  and
  a photolithography unit that uses the sets of masks in an integrated circuit fabrication process.

16. The system of claim 15, wherein to identify a cell within a chip design that includes a plurality of cells with potential risks of violating one or more triple-patterning DRC rules in the vertical direction, the processor is further configured to:
  determine whether one or more patterns is located within a pre-defined spacing to a cell top boundary or within a pre-defined spacing of a cell bottom boundary; and
  add the cell attribute to the profile of the cell, wherein the cell attribute indicates the one or more triple-patterning DRC violations is located within the pre-defined spacing to the cell top boundary or within the pre-defined spacing of the cell bottom boundary.

17. The system of claim 16, wherein when the cell attribute indicates the one or more triple-patterning DRC violations are located within the pre-defined spacing to the cell top boundary, the processor is further configured to:
  insert a placement blockage from among the one or more placement blockages on a corresponding placement site within the cell.

18. The system of claim 16, wherein when the cell attribute indicates the one or more triple-patterning DRC violations is located within the pre-defined spacing to the cell bottom boundary, the processor is further configured to:
  insert a placement blockage from among the one or more placement blockages under the cell bottom boundary of a corresponding placement site and one or more neighboring placement sites.

19. The system of claim 15, wherein to identify the cell with the triple patterning DRC violations in the horizontal direction, the processor is further configured to:
  determine whether a path exists from a first group of patterns to a second group of patterns through a third group of patterns, wherein the first group of patterns is located within a pre-defined spacing to a cell left boundary, the second group of patterns is located within the predefined spacing to a cell right boundary, and the third group of patterns is located in a region between the first group of patterns and the second group of patterns; and
  add the cell attribute to the profile of the cell, wherein the cell attribute indicates that the one or more triple-patterning DRC violations exists in the horizontal direction when the path exists.

20. The system of claim 19, wherein the processor is further configured to:
  insert a placement blockage from among the one or more placement blockages on a neighbor placement site when the cell attribute indicates that the one or more triple-patterning DRC violations exists in the horizontal direction.

* * * * *